United States Patent
Castillo Lema

(10) Patent No.: US 12,408,047 B2
(45) Date of Patent: Sep. 2, 2025

(54) MANAGEMENT ORCHESTRATOR FOR A CONTENT-CENTRIC NETWORK IN A 6G NETWORK

(71) Applicant: Red Hat, Inc., Raleigh, NC (US)

(72) Inventor: Jose Castillo Lema, Sao Paulo (BR)

(73) Assignee: Red Hat, Inc., Raleigh, NC (US)

( * ) Notice: Subject to any disclaimer, the term of this patent is extended or adjusted under 35 U.S.C. 154(b) by 490 days.

(21) Appl. No.: 17/985,750

(22) Filed: Nov. 11, 2022

(65) Prior Publication Data
US 2024/0163689 A1      May 16, 2024

(51) Int. Cl.
*H04W 24/02*     (2009.01)
*H04L 41/0895*     (2022.01)

(52) U.S. Cl.
CPC ......... *H04W 24/02* (2013.01); *H04L 41/0895* (2022.05)

(58) Field of Classification Search
CPC ............. H04W 24/00–04; H04L 41/08; H04L 41/0893–0895
See application file for complete search history.

(56) References Cited

U.S. PATENT DOCUMENTS

| | | | |
|---|---|---|---|
| 10,397,132 B2 | 8/2019 | Xia et al. | |
| 11,064,321 B2 * | 7/2021 | Jha | H04W 4/02 |
| 11,115,867 B2 | 9/2021 | Dowlatkhah et al. | |
| 11,297,555 B2 | 4/2022 | Dowlatkhah et al. | |
| 11,381,636 B2 * | 7/2022 | Alam | G06N 3/045 |
| 11,533,316 B2 * | 12/2022 | Smith | H04L 63/105 |
| 2021/0320988 A1 * | 10/2021 | Zhang | H04W 40/24 |
| 2021/0328783 A1 * | 10/2021 | Doshi | H04L 9/0861 |
| 2021/0328873 A1 | 10/2021 | Yeung et al. | |
| 2022/0158934 A1 * | 5/2022 | Himayat | H04L 45/745 |
| 2023/0014064 A1 * | 1/2023 | Cheruvu | H04L 63/101 |

FOREIGN PATENT DOCUMENTS

DE    112020003252 T5 *   4/2022   ............. H04L 45/26

OTHER PUBLICATIONS

Castillo-Lema, José & Venancio Neto, Augusto & Silva, Flávio & Kofuji, Sergio. (2019). Network Function Virtualization in Content-Centric Networks. 31-37.*

(Continued)

*Primary Examiner* — Brendan Y Higa
(74) *Attorney, Agent, or Firm* — Kilpatrick Townsend & Stockton LLP

(57) ABSTRACT

A management orchestrator for a content-centric network in a 6G network is described herein according to some aspects. For example, the management orchestrator can receive, from a client device, a request for a network function in the content-centric network executed by a plurality of network nodes in the 6G network. In response to receiving the request for the network function, the management orchestrator can identify a particular network node of the plurality of network nodes usable for executing the network function. The management orchestrator can then automatically deploy a named function via the particular network node. The named function can be used to execute the network function for the client device.

20 Claims, 3 Drawing Sheets

(56) References Cited

OTHER PUBLICATIONS

X. Marchal et al., "Leveraging NFV for the deployment of NDN: Application to HTTP traffic transport," NOMS 2018—2018 IEEE/IFIP Network Operations and Management Symposium, Taipei, Taiwan, 2018.*

Arumaithurai et al., "Exploiting ICN for Flexible Management of Software-Defined Networks," ACM-ICN '14: Proceedings of the 1st ACM Conference on Information-Centric Networking, Sep. 24, 2014: pp. 107-116, <https://doi.org/10.1145/2660129.2660147>.

Clayman et al., "The Dynamic Placement of Virtual Network Functions," 2014 IEEE Network Operations and Management Symposium (NOMS), 2014: pp. 1-9.

Diaz et al., "Towards an ICN-based architecture to enhanced mobility challenges over future heterogeneous mobile networks," Universite Sorbonne, Institut Galilee, 2020: pp. 1-4.

Gürkan et al., "Convergence of ICN and MEC for 5G: Opportunities and Challenges," IEEE Communications Standards Magazine, Dec. 2020: pp. 64-71.

Ravindran et al., "Towards Software Defined ICN based Edge-Cloud Services," 2013 IEEE 2nd International Conference on Cloud Networking (CloudNet): Industry-Track Paper, Nov. 2013: pp. 227-235, <https://ieeexplore.ieee.org/document/6710583>.

\* cited by examiner

MANAGEMENT ORCHESTRATOR FOR A CONTENT-CENTRIC NETWORK IN A 6G NETWORK

TECHNICAL FIELD

The present disclosure relates generally to content-centric networks and, more particularly (although not necessarily exclusively), to a management orchestrator for a content-centric network in a 6G network.

BACKGROUND

Network functions virtualization (NFV) allows network services and functions to be virtualized instead of being run on proprietary hardware. Network functions are playing an increasingly important role in modern networks, ranging from mobile networks, enterprise networks, to data-center networks. Network functions can improve the performance of a network (e.g., optimizers for Wide Area Networks, web proxies and video transcoders, or load balancers), enhance network security, or monitor network traffic. The need to perform additional processing of packets of a data flow in a network before the packets are delivered to a destination has become an integral part of providing Internet services. Such network functions include performing the modification of packet headers, discarding packets, collection of statistical information, or even modification of the payload (e.g., optimization and compression).

DETAILED DESCRIPTION

Figure 1:
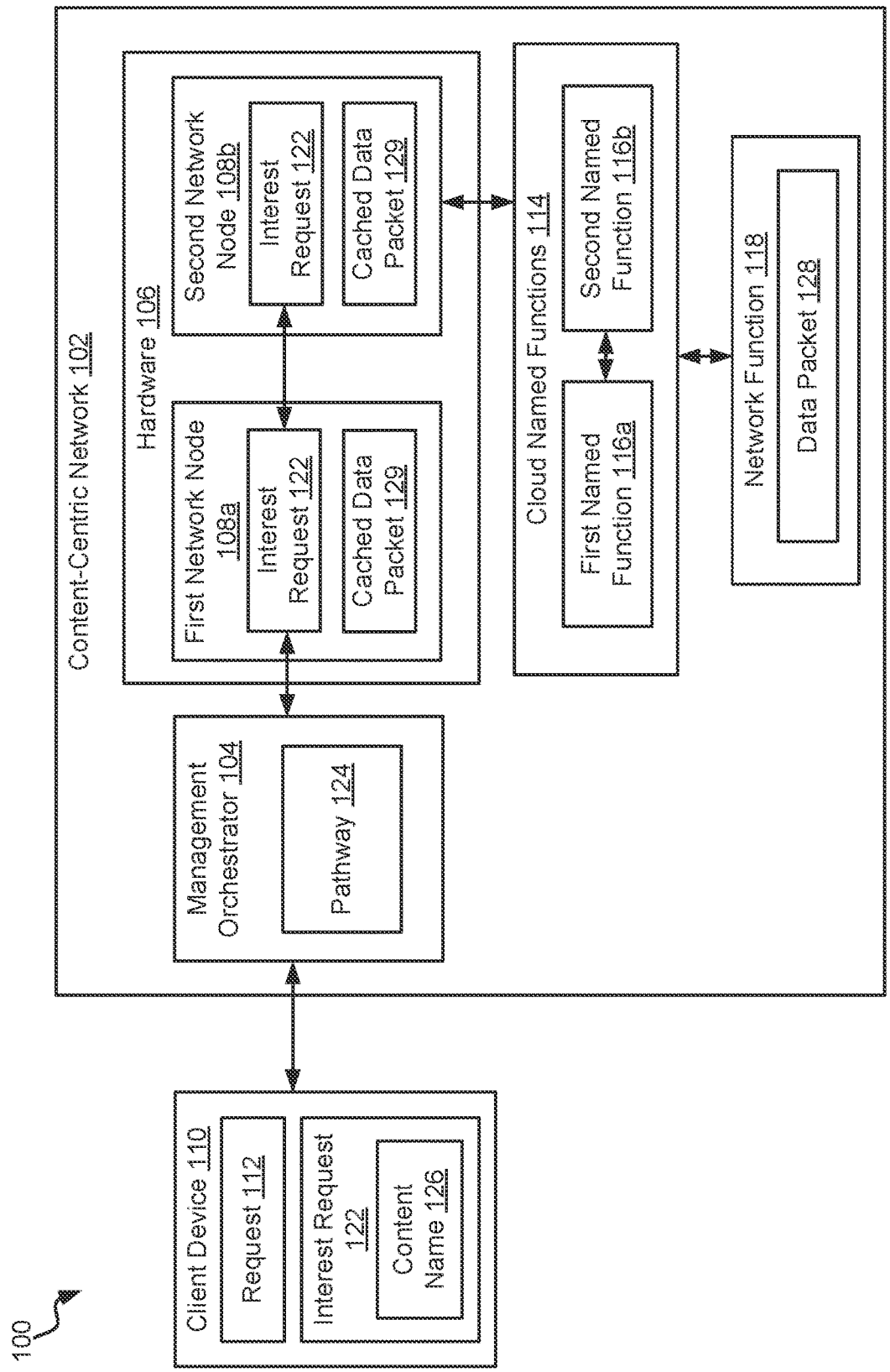
FIG. 1 is a block diagram of an example of a management orchestrator for a content-centric network in a 6G network according to some examples of the present disclosure.

In recent years, extensive effort has been made to evolve and mature network functions virtualization (NFV) technologies over Internet Protocol (IP) networks. In IP networks, network functions have to be resident on the path of a flow for a packet. This may cause network traffic (such as packets) to be deviated from its "natural" IP shortest path to be instead routed through the network functions. Current routing protocols deployed in IP networks constrain how packets can be deviated from the shortest path. Additionally, network functions in IP networks are managed via a central controller, which can lead to computing performance penalties and scalability limitations. Thus, network functions used in IP networks are unable to take full advantage of the great flexibility offered by NFV. IP networks deliver packets to a particular destination based on an address in a header of the packet. In contrast, endpoints in content-centric networks (CCNs) communicate based on named data instead of IP addresses. CCNs are expected to be a fundamental construct of 6G networks, but little or no attempts have been made to incorporate network functions into CCNs.

Some examples of the present disclosure overcome one or more of the abovementioned problems by implementing a management orchestrator for network functions for CCNs within 6G networks. The management orchestrator can implement and use network services and network functions, such as Virtual Network Functions (VNFs) or Cloud Native Functions (CNFs). By using the Named Function Networking (NFN) paradigm, the management orchestrator can distribute network functions and services through network nodes via named functions. NFN decouples network traffic from location of data. For example, in NFN, named functions are distributed throughout the network and are called using their name, rather than their IP address. Client devices ask for a service from a network function by name. The management orchestrator can then automatically route the request to the closest network node that supports the named function for the network function. No registry or lookup is required, reducing latency in the network.

Named functions are distinct from network functions. For example, "network function" is a generic term that refers to hardware or software that implements network services, and is typically implemented through virtual network functions. On the other hand, named functions extend the capability of a CCN from simply resolving data access by name to also supporting function definition by name. Network functions can be implemented through named functions distributed throughout network nodes in the CCN by the management orchestrator.

The use of NFN can provide the flexibility to dynamically place network functions in the 6G network as needed and without the need of a central controller. The management orchestrator can provide a scalable and flexible framework that can perform automated deployment, management, monitoring, optimization, and lifecycle management of named functions over a CCN in a 6G network. Using the management orchestrator to manage named functions and their network functions can reduce computational resources, power usage, response times, and inter-node traffic of the 6G network. Network functions can therefore be deployed over commodity hardware, without the need of a central controller for performing service chaining.

Additionally, in-network caching by network nodes can be performed. For example, a client device may issue an interest request for a particular network function. The management orchestrator may route the interest request through a first network node and then a second network node. The network function can be deployed on the second network node, and can fulfill the interest request by generating and transmitting a data packet back to the client device. The data packet can be transmitted from the second network node to the first network node, and from the first network node to the client device. The data packet can be cached by the first network node and the second network node. Later, a client device (e.g., the original client device or a separate client device) can issue the same interest request. Although the network function is deployed on the second network node, either the first network node or the second network node may fulfill the interest request using the cached data packet. In-network caching can speed up distribution of data between network nodes and client devices, and can also reduce traffic load on the server side.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a management orchestrator for a content-centric network (CCN) 102 in a 6G network 100 according to some examples of the present disclosure. The 6G network 100 can include a CCN 102 that is executed by hardware 106 that includes one or more network nodes 108a-b. Examples of the network nodes 108a-b can include routers, sensors, controllers, switches, modems, or other suitable node devices. The network nodes 108a-b can deploy cloud named functions 114 requested by a client device 110. Examples of the client device can include laptop computers, desktop computers, servers, mobile phones, tablets, or the like.

The cloud named functions 114 can implement network functions 118 for the 6G network 100, such as virtualized routers, firewalls, Wide Area Network (WAN) optimization, or the like. The network functions 118 can be virtual network functions or cloud native functions. The cloud named functions 114 are deployed and managed by the management orchestrator 104. For example, the management orchestrator 104 can allocate hardware 106, such as a particular network node 108, for placing or configuring cloud named functions 114 in response to a request 112 from the client device 110. One or more cloud named functions 114 can then be used to execute a network function 118. In some examples, the management orchestrator 104 can chain cloud named functions 114 together, such as a first named function 116a to a second named function 116b, to implement a single network function 118. The first named function 116a and the second named function 116b can be configured on a single network node, such as the second network node 108b, or across multiple network nodes 108a-b.

The management orchestrator 104 can dynamically place cloud named functions 114 across the CCN 102 such that latency for the CCN 102 can be minimized. Additionally, the management orchestrator 104 can place cloud named functions 114 to be on-path for network flow of data packets 128. This introduces minimal inference to network traffic and obviates the need for complicated forwarding rules in routers. After deployment of the cloud named functions 114, the management orchestrator 104 can upgrade, release, reclaim hardware 106, and perform any other lifecycle management operations with respect to the cloud named functions 114.

Rather than being called via their location on one of the network nodes 108a-b, the cloud named functions 114 can be called by their name. For example, the client device 110 can transmit an interest request 122 for a data packet 128 from a network function 118 in the CCN 102 to the management orchestrator 104. The interest request 122 can call for the network function by its content name 126. The management orchestrator 104 can direct the interest request 122 to the closes network node, such as the first network node 108a. The first network node 108a may identify that the first network node 108a does not execute the network function 118. In response, the first network node 108a can then identify another nearby network node that may execute the network function 118. For example, the first network node 108a may identify, based on the content name 126, that the second network node 108b may execute the network function 118. Therefore, the first network node 108a can transmit the interest request 122 to the second network node 108b.

In examples where the network function 118 is not deployed on the second network node 108b, the second network node 108b can transmit the interest request 122 to another network node, and the process can continue until the proper network node receives the interest request 122. In other examples, the second network node 108b can identify that the network function 118 is deployed on the second network node 108b based on the content name 126. The network function 118 can be implemented on the second network node 108b via chained named functions 116a-b having the content name 126. The named functions 116a-b can cause the network function 118 to fulfill the interest request 122, thereby generating a data packet 128 for the client device 110. The data packet 128 can then be transmitted back to the client device 110 in a reverse of the pathway 124 that the interest request 122 travelled to the second network node 108b. For example, the interest request 122 was transmitted from the client device 110, to the first network node 108a, and then to the second network node 108b. The data packet 128 can be transmitted on a reverse pathway from the second network node 108b, to the first network node 108a, and then to the client device 110.

In some examples, the data packet 128 may be cached by the network nodes 108a-b as the data packet 128 is transmitted to the client device 110. For example, after generating the data packet 128, the second network node 108b can store a cached data packet 129 for the interest request 122 and corresponding data packet 128. Additionally, the first network node 108a can also store the cached data packet 129 in response to receiving the data packet 128 for transmission to the client device 110. Because the network nodes 108a-b store the cached data packet 129, future identical interest requests for the network function 118 can be fulfilled using the cached data packet 129 in any network node 108 that first receives the interest request 122. For example, the client device 110 may send a subsequent interest request 122 to the management orchestrator 104 that is identical to the original interest request 122. The management orchestrator 104 can route the subsequent interest request 122 to the first network node 108a. The first network node 108a can fulfill the interest request 122 and generate the data packet 128 using the cached data packet 129. Thus, the interest request 122 may not be transmitted to the second network node 108b at all, and the network function 118 may not be needed to generate the data packet 128. This can significantly reduce latency in the CCN 102.

Although FIG. 1 depicts a certain number and arrangement of components, this is for illustrative purposes and intended to be non-limiting. Other examples may include more components, fewer components, different components, or a different arrangement of the components shown in FIG. 1. For example, although a single client device 110 is depicted as transmitting a request 112 for a new network function 118 and transmitting an interest request 122 for the data packet 128, the request 112 and the interest request 122 may be transmitted by two separate client devices. Additionally, although the management orchestrator 103 for the CCN 102 is described as being within a 6G network, the components described herein may be implemented any subsequent generation of mobile network, such as 7G or 8G networks.

Figure 2:
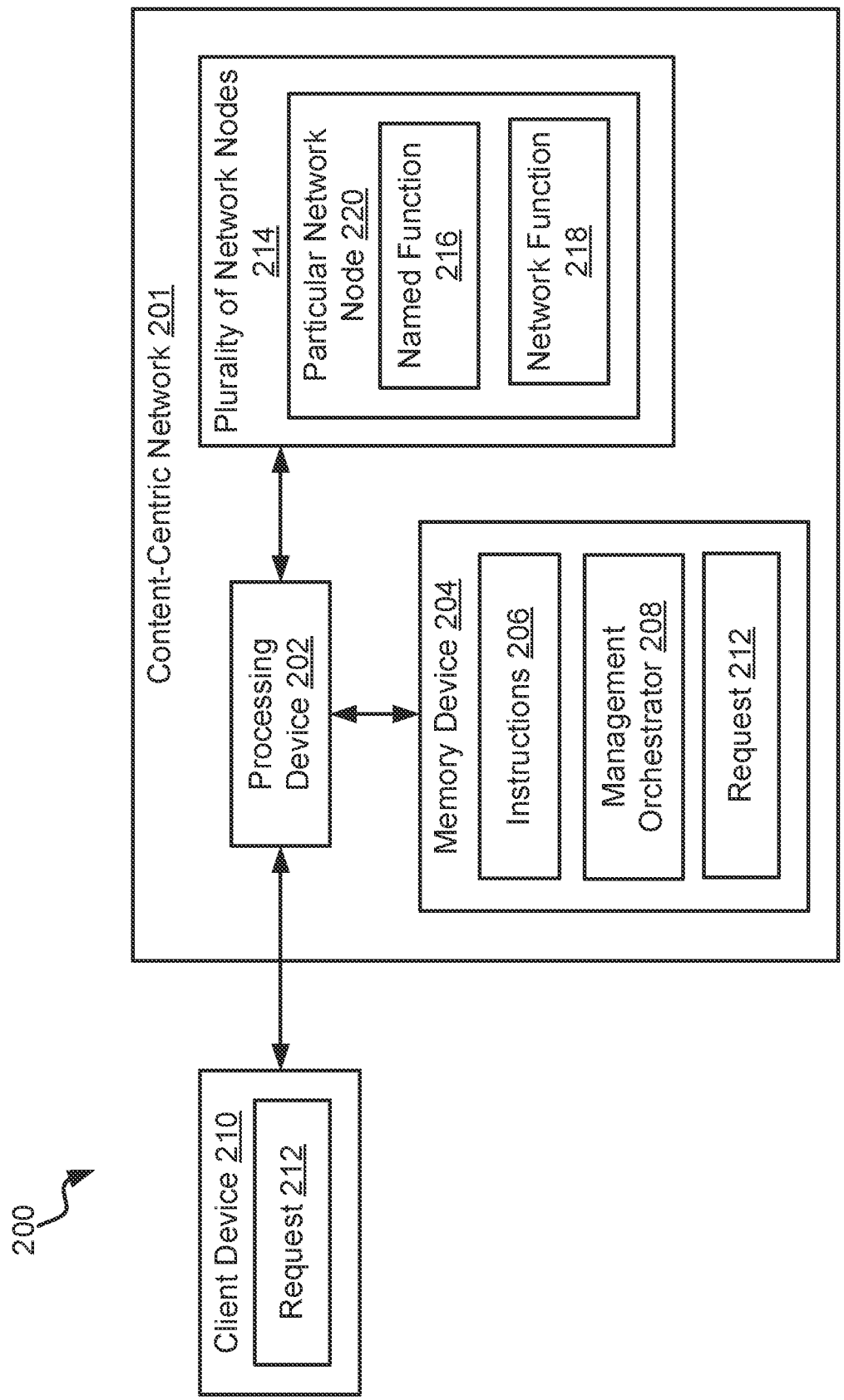
FIG. 2 is a block diagram of another example of a management orchestrator for a content-centric network in a 6G network according to some examples of the present disclosure.

FIG. 2 is a block diagram of another example of a management orchestrator 208 for a content-centric network 201 in a 6G network 200 according to some examples of the present disclosure. The 6G network 200 includes a processing device 202 communicatively coupled to a memory 204. The processing device 202 can include one processing device or multiple processing devices. Non-limiting examples of the processing device 202 include a Field-Programmable Gate Array (FPGA), an application-specific integrated circuit (ASIC), a microprocessor, etc. The processing device 202 can execute instructions 206 stored in the memory 204 to perform the operations. In some examples, the instructions 206 can include processor-specific instructions generated by a compiler or an interpreter from code written in any suitable computer-programming language, such as C, C++, C #, etc.

Memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processing device 202 can read instructions 206. A computer-readable medium can include electronic, optical, magnetic, or other storage devices capable of providing the processing device 202 with computer-readable instructions 206 or other program code. Examples of a computer-readable medium can include magnetic disks, memory chips, ROM, random-access memory RAM, an ASIC, a configured processor, optical storage, or any other medium from which a computer processor can read instructions 206.

The processing device 202 can execute instructions 206 to execute the management orchestrator 208 for the 6G network 200. For example, the management orchestrator 208 can receive, from a client device 210, a request 212 for a network function 218 in a content-centric network 201 executed by a plurality of network nodes 214 in the 6G network 200. The processing device 202 can identify a particular network node 220 of the plurality of network nodes 214 usable for executing the network function 218 in response to receiving the request 212 for the network function 218. Then, the processing device 202 can automatically deploy a named function 216 in the particular network node 220. The processing device 202 can deploy the network function 218 for the client device 210 in the content-centric network 201 in the 6G network 200 using the named function 216.

Figure 3:
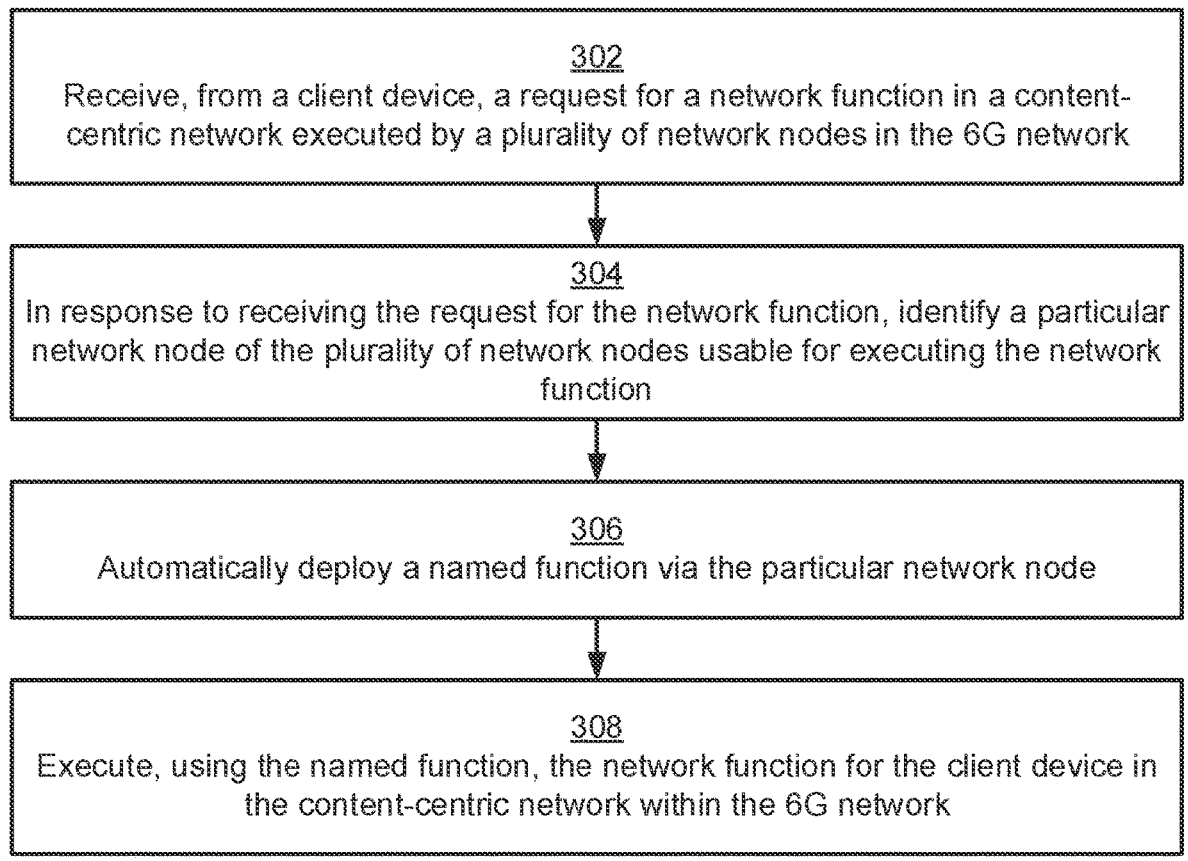
FIG. 3 is a flowchart of a process for using a management orchestrator for a content-centric network in a 6G network according to some examples of the present disclosure.

FIG. 3 is a flowchart of a process for using a management orchestrator 208 for a content-centric network 201 in a 6G network 200 according to some examples of the present disclosure. FIG. 3 is described with references to components in FIGS. 1-2. Other examples can include more steps, fewer steps, different steps, or a different order of the steps than is depicted in FIG. 3.

At step 302, the process 300 involves receiving, by the processing device 202 and from a client device 210, a request 212 for a network function 218 in a content-centric network 201 executed by a plurality of network nodes 214 in a 6G network 200. For example, the client device 210 may transmit the request 212 for a new network function 218 that is a firewall for data packets received by the client device 210. The request 212 can be received by the management orchestrator 208, which manages the plurality of network nodes 214 and any functions executing thereon.

At step 304, the process 300 involves, in response to receiving the request 212 for the network function 218, identifying, by the processing device 202, a particular network node 220 of the plurality of network nodes 214 usable for executing the network function 218. For example, the processing device 202 can execute the management orchestrator 208 to identify a particular network node 220 that has available hardware and software resources necessary for executing a firewall for the client device 210. In some examples, the management orchestrator 208 may identify a particular network node 220 that is relatively physically close to the client device 210. This is because nodes that are closer to the client device 210 may cause less latency in the content-centric network 201 when executing the network function 218 for the client device 210. The management orchestrator 208 may also determine the particular network node 220 based on a data packet flow for the client device 210. For example, if data packets received by the client device originate from a first network node, travel to a second network node, and then travel to the client device, the management orchestrator 208 may identify the second network node as the particular node. In this way, data packets that will be inspected by the firewall will not be rerouted off of the typical data packet flow if the network function is deployed by the second network node.

At step 306, the process 300 involves automatically deploying, by the processing device 202, a named function 216 via the particular network node 220. The processing device 202 can execute the management orchestrator 208 to automatically deploy the named function 216 in response to identifying the particular network node 220. The named function 216 is a function or service that can be called by name, rather than address or location. For example, the client device 210 may interact with the named function 216 by sending an interest request 122 to the management orchestrator 208 for the "firewall." The management orchestrator 208 can direct the interest request 122 to a first network node that may or may not be executing the firewall. If the first network node is the particular network node 220 executing the firewall, the first network node can fulfill the interest request 122. If the first network node is not executing the firewall, the first network node can transmit the interest request 122 to another nearby network node. This can continue until the interest request 122 is received by the particular network node 220 that is executing the network function 218 called "firewall."

In some examples, the processing device 202 can execute the management orchestrator 208 to automatically deploy more than one named function 216. The management orchestrator 208 may do so when multiple named functions are needed to execute the network function 218 requested by the client device 210. For example, the request 212 for a network function 218 from the client device 210 for a firewall may involve a firewall function for data packets from both directions. In such an example, the management orchestrator 208 may automatically deploy a first named function 116a that is a firewall that can inspect data packets transmitted by the client device 210 and a second named function 116b that is a firewall that inspects data packets received by the client device 210. The first named function 116a and the second named function 116b may each be automatically deployed on the particular network node 220. The management orchestrator 208 can then chain the first named function 116a to the second named function 116b.

In some examples, instead of automatically deploying a new named function 216, the management orchestrator 208 can identify existing named functions 216 that can execute the network function 218 requested by the client device 210. In one example, the management orchestrator 208 may identify an existing named function 216 executing a network function 218 that is a firewall, that fulfills the request 212 transmitted by the client device 210. The management orchestrator 208 can then assign the named function 216 to the client device 210 for the firewall. In another example, the management orchestrator 208 may identify at least two named functions deployed on the particular network node 220 that can be used to execute the network function 218. The management orchestrator 208 can then chain the at least two named functions together. The chained named functions can be used to fulfill the request 212 from the client device 210.

At step 308, the process 300 involves executing, by the processing device 202 and using the named function 216, the network function 218 for the client device 210 in the content-centric network 201 within the 6G network 200. The named function 216 can implement the network function 218 requested by the client device 210. For example, interest requests for the network function 218 can be transmitted using the name of the named function (e.g., "firewall"). In examples where the network function 218 is executed by chained named functions 116a-b, the network function 218 may be called by any of the names of the chained named functions 116-ab. The operation performed by the network function 218 may depend on the name of the named function 116 that is called. For example, a data packet received by the particular network node 220 may have an interest request 122 called "firewall—incoming." This can indicate that the second named function 116b, which is a firewall handling data packets received by the client device 210, should execute the network function 218 to handle the interest request 122. The second named function 116b can execute the network function 218 to inspect the data packet and then to transmit the inspected data packet to the client device 210.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a processing device; and
   a memory comprising instructions for causing the processing device to execute a management orchestrator for a 6G network to:
      receive, from a client device, a request for a network function in a content-centric network executed by a plurality of network nodes in the 6G network;
      in response to receiving the request for the network function, identify a particular network node of the plurality of network nodes usable for executing the network function;
      automatically deploy a named function via the particular network node; and
      execute, using the named function, the network function for the client device in the content-centric network within the 6G network.

2. The system of claim 1, wherein the memory is further executable by the processing device for causing the processing device to, subsequent to executing the network function for the client device:
   receive, at a first network node of the plurality of network nodes, an interest request for the network function from the client device, the interest request including a content name;
   identify, based on the content name, that the first network node does not execute the network function;
   in response to identifying that the first network node does not execute the network function, identify, based on the content name, a second network node of the plurality of network nodes to receive the interest request; and
   transmit the interest request to the second network node of the plurality of network nodes.

3. The system of claim 2, wherein the memory is further executable by the processing device for causing the processing device to, in response to transmitting the interest request to the second network node:
   identify, based on the content name, that the second network node executes the network function, the network function being executed by the named function associated with the content name;
   fulfill, by the named function, the interest request for the network function to generate a data packet; and
   transmit the data packet to the client device.

4. The system of claim 3, wherein the memory is further executable by the processing device for causing the processing device to transmit the data packet to the client device by:
   transmitting the data packet from the second network node to the first network node;
   in response to transmitting the data packet from the second network node to the first network node, caching, by the first network node, the data packet; and
   transmitting the data packet from the first network node to the client device.

5. The system of claim 4, wherein the memory is further executable by the processing device for causing the processing device to:
   receive, by the first network node, a subsequent interest request for the network function; and
   in response to receiving the subsequent interest request, fulfill, by the first network node, the subsequent interest request using the cached data packet.

6. The system of claim 1, wherein the memory is further executable by the processing device for causing the management orchestrator to:
   identify at least two named functions deployed on the particular network node and usable for executing the network function;
   chain the at least two named functions; and
   execute the network function using the at least two named functions that are chained.

7. The system of claim 1, wherein the network function comprises a virtual network function or a cloud native function.

8. A method comprising:
   receiving, by a processing device executing a management orchestrator for a 6G network and from a client device, a request for a network function in a content-centric network executed by a plurality of network nodes in the 6G network;
   in response to receiving the request for the network function, identifying, by the management orchestrator, a particular network node of the plurality of network nodes usable for executing the network function;
   automatically deploying, by the management orchestrator, a named function via the particular network node; and
   executing, by the management orchestrator and using the named function, the network function for the client device in the content-centric network within the 6G network.

9. The method of claim 8, further comprising, subsequent to executing the network function for the client device:
   receiving, at a first network node of the plurality of network nodes, an interest request for the network function from the client device, the interest request including a content name;

identifying, based on the content name, that the first network node does not execute the network function;

in response to identifying that the first network node does not execute the network function, identifying, based on the content name, a second network node of the plurality of network nodes to receive the interest request; and transmitting the interest request to the second network node of the plurality of network nodes.

10. The method of claim 9, further comprising, in response to transmitting the interest request to the second network node:

identifying, based on the content name, that the second network node executes the network function, the network function being executed by the named function associated with the content name;

fulfilling, by the named function, the interest request for the network function to generate a data packet; and transmitting the data packet to the client device.

11. The method of claim 10, wherein transmitting the data packet to the client device further comprises:

transmitting the data packet from the second network node to the first network node;

in response to transmitting the data packet from the second network node to the first network node, caching, by the first network node, the data packet; and transmitting the data packet from the first network node to the client device.

12. The method of claim 11, further comprising:

receiving, by the first network node, a subsequent interest request for the network function; and in response to receiving the subsequent interest request, fulfilling, by the first network node, the subsequent interest request using the cached data packet.

13. The method of claim 8, further comprising:

identifying at least two named functions deployed on the particular network node and usable for executing the network function;

chaining the at least two named functions; and executing the network function using the at least two named functions that are chained.

14. The method of claim 8, wherein the network function comprises a virtual network function or a cloud native function.

15. A non-transitory computer-readable medium comprising program code that is executable by a processing device for causing a management orchestrator for a 6G network to:

receive, from a client device, a request for a network function in a content-centric network executed by a plurality of network nodes in the 6G network;

in response to receiving the request for the network function, identify a particular network node of the plurality of network nodes usable for executing the network function;

automatically deploy a named function via the particular network node; and execute, using the named function, the network function for the client device in the content-centric network within the 6G network.

16. The non-transitory computer-readable medium of claim 15, further comprising program code that is executable by the processing device for causing the processing device to, subsequent to executing the network function for the client device:

receive, at a first network node of the plurality of network nodes, an interest request for the network function from the client device, the interest request including a content name;

identify, based on the content name, that the first network node does not execute the network function;

in response to identifying that the first network node does not execute the network function, identify, based on the content name, a second network node of the plurality of network nodes to receive the interest request; and transmit the interest request to the second network node of the plurality of network nodes.

17. The non-transitory computer-readable medium of claim 16, further comprising program code that is executable by the processing device for causing the processing device to, in response to transmitting the interest request to the second network node:

identify, based on the content name, that the second network node executes the network function, the network function being executed by the named function associated with the content name;

fulfill, by the named function, the interest request for the network function to generate a data packet; and transmit the data packet to the client device.

18. The non-transitory computer-readable medium of claim 17, further comprising program code is executable by the processing device for causing the processing device to transmit the data packet to the client device by:

transmitting the data packet from the second network node to the first network node;

in response to transmitting the data packet from the second network node to the first network node, caching, by the first network node, the data packet; and transmitting the data packet from the first network node to the client device.

19. The non-transitory computer-readable medium of claim 18, further comprising program code that is executable by the processing device for causing the processing device to:

receive, by the first network node, a subsequent interest request for the network function; and in response to receiving the subsequent interest request, fulfill, by the first network node, the subsequent interest request using the cached data packet.

20. The non-transitory computer-readable medium of claim 15, further comprising program code that is executable by the processing device for causing the management orchestrator to:

identify at least two named functions deployed on the particular network node and usable for executing the network function;

chain the at least two named functions; and execute the network function using the at least two named functions that are chained.

* * * * *